United States Patent [19]
Campbell

[11] 3,743,393
[45] July 3, 1973

[54] EPICYCLIC CAMERA

[76] Inventor: Rouel R. Campbell, 7064 E. 52nd St., Tulsa, Okla. 74145

[22] Filed: Oct. 28, 1971

[21] Appl. No.: 193,406

[52] U.S. Cl............ 352/84, 352/105, 352/106, 352/109
[51] Int. Cl. .......................... G03b 41/04
[58] Field of Search............ 352/84, 105, 106, 352/107, 108, 109, 110, 111, 112

[56] References Cited
UNITED STATES PATENTS
3,029,685   4/1962   Korneff............... 352/84 X
3,257,899   6/1966   Hoyt.................. 352/84 X

*Primary Examiner*—Samuel S. Matthews
*Assistant Examiner*—Monroe H. Hayes
*Attorney*—William S. Dorman

[57] ABSTRACT

A high speed motion picture camera wherein the film moves continuously during a filming operation, and having an optical system through which the light passes continuously; hence, the epicyclic camera principle in which the film, the shutter and the image are in coordinated motion. The epicyclic camera may be utilized for taking substantially any number of pictures per revolution with good picture quality and superior picture steadiness.

21 Claims, 17 Drawing Figures

ROUEL R. CAMPBELL
INVENTOR

BY William S. Dorman
ATTORNEY

ROUEL R. CAMPBELL
INVENTOR

BY
William S. Dorman
ATTORNEY

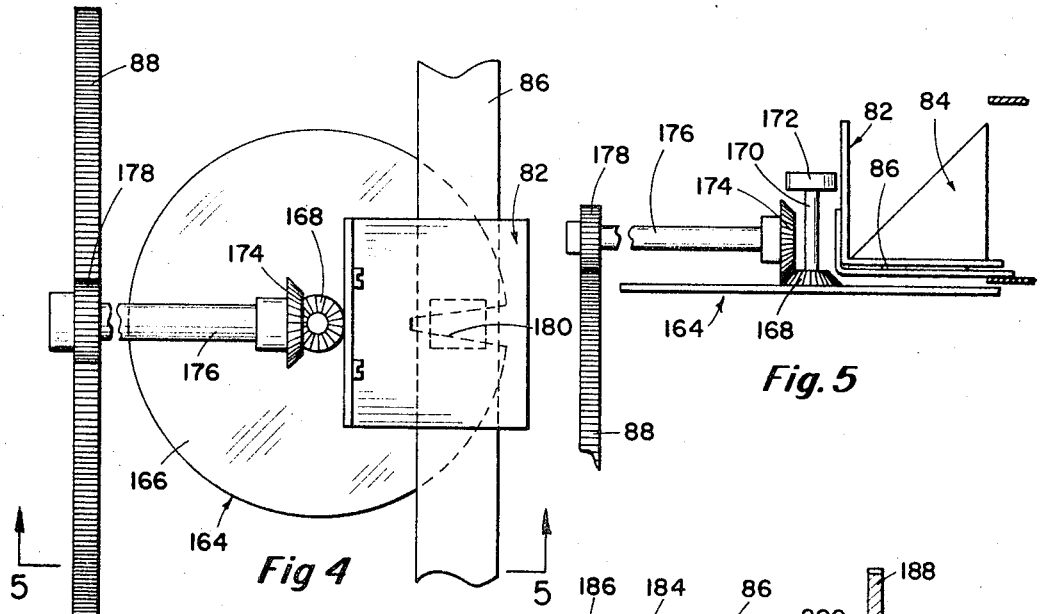
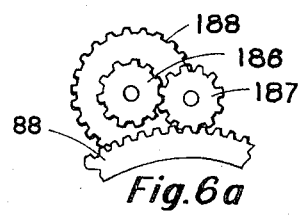
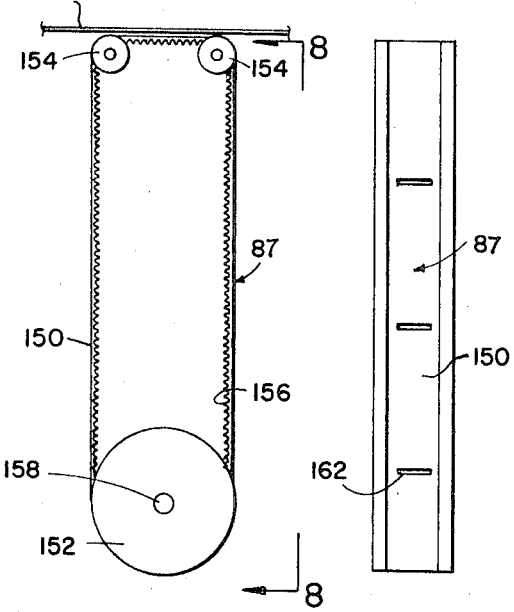
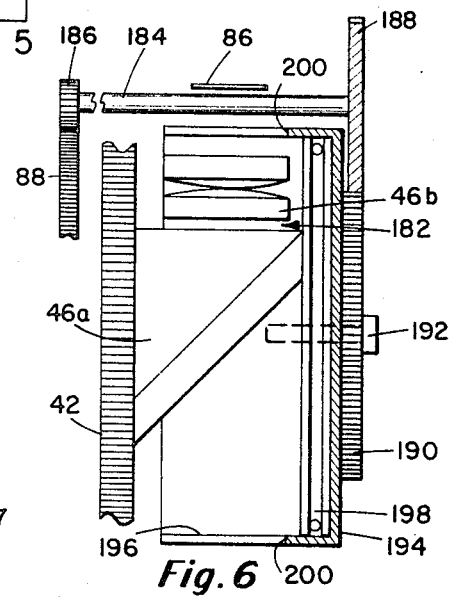
Fig. 4
Fig. 5
Fig. 6a
Fig. 6
Fig. 7
Fig. 8
ROUEL R. CAMPBELL
INVENTOR
BY
William S. Dorman
ATTORNEY

ROUEL R. CAMPBELL
INVENTOR

BY

*William S. Dorman*
ATTORNEY

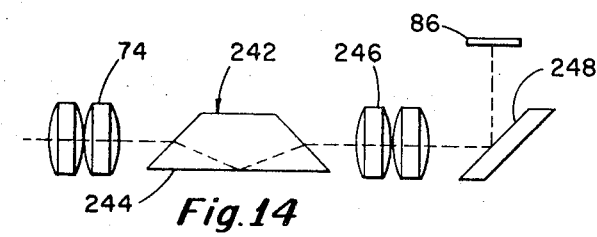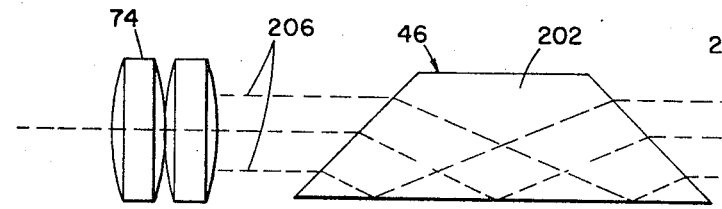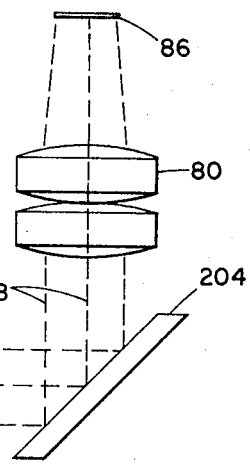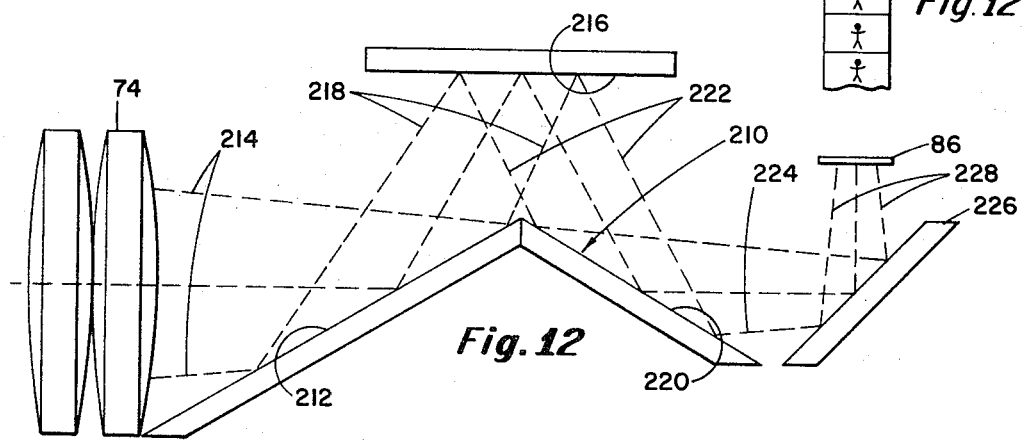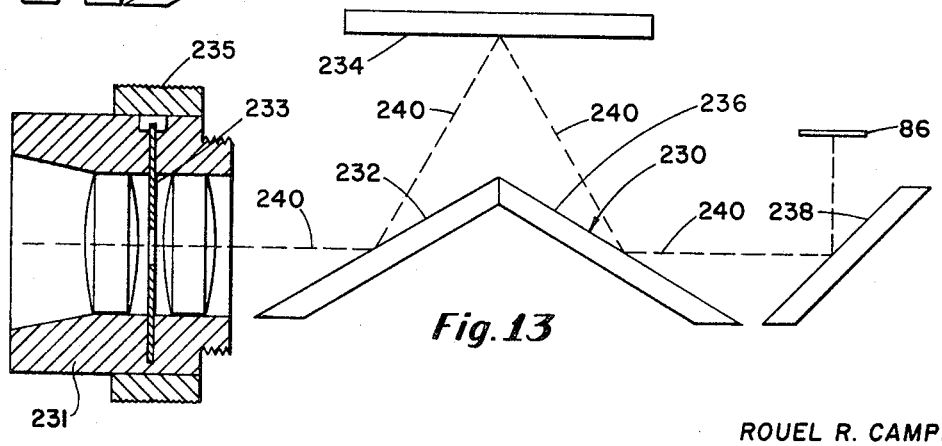

EPICYCLIC CAMERA

This invention relates to improvements in cameras and more particularly, but not by way of limitation, to a high speed motion picture camera.

BACKGROUND OF THE INVENTION

There are many instances wherein it is desirable to photograph movement or action at extremely high speeds. For example, in the study of stress, or the like, on the working elements of a machine in operation, a fast or high speed motion picture of the apparatus during the acutal operation provides a film which may be projected at a substantially reduced rate of speed which permits viewing of the working elements or mechanical parts for studying thereof during the actual working conditions. For best results in this type of photography, it is desirable to photograph the machine operation at ultra high frame rates, such as at 10,000 frames per second, and above to arrest motion for study. Presently available ultra high speed cameras are normally of the polygon prism type embodying many inherent defects, such as poor resolution at the corners of the picture, unsteadiness, and low light acceptance. The polygon prism normally has eight sides and a high speed of 75,000 R.P.M. at 10,000 frames per second.

SUMMARY OF THE INVENTION

The present invention relates to a novel high speed motion picture camera of an epicyclic type particularly designed and constructed for taking substantially any number of pictures per revolution. For example, 64 pictures per revolution will require 9,375 R.P.M. at 10,000 frames per second. In the low range intermittent high speed camera (approximately 500 frames per second) the epicyclic camera can attain 1,000 frames per second with conparable picture quality and superior picture steadiness.

The novel epicyclic camera comprises a combination of elements comprising an objective lens, a relay lens system, a dove prism, a shutter, mirror and film reels disposed co-axially and so coordinated in a planetary motion or epicyclic in principle to expose picture frames on movie camera film of substantially any size. There are many advantages of this novel method, as follows:

1. Freedom to design optical systems to accept all of the light the objective lens will collect.
2. Freedom to design for any number of pictures in one revolution of the epicyclic wheel, thereby controlling the number of turns per frame per second.
3. Picture steadiness because of the single optical system versus multi system in a polygon prism.

The purpose of the dove prism used in the epicyclic camera is to prevent tumbling of the picture on the film. The prism is rotated at a speed one half that of the speed of rotation of the film carrying wheel, and also positions the picture properly on the film for standard projection. The dove prism also permits the camera to be used for trick photography by altering the orientation of the prism to change the position of the image on the film; and for other useful purposes, such as photographing an object not having a top or bottom, such as in outer space, but which may best be viewed from a certain position. The dove prism will permit this desired orientation of the image of the object on the film strip. A mirror system may also be used since the novel mirror system of the present invention has the same properties as the dove prism except that the light in the mirror system passes through air, thereby reducing light loss and aberrations inherent in a dove prism.

The photographic principle can be likened to a paint brush wherein the brush and the film are stationary in space for that moment in time by proper timing of the slit type shutter while all three, the picture, the film and the shutter, are travelling as planets in space. An adjustable objective lens is provided for the camera and suitable lenses are disposed within the camera for receiving the image from the objective lens. The image is picked up from the objective lens and transmitted to the film through the reflecting or optical system in a one to one ratio, or unity. These lenses are of a sufficient size to accept all the light collected by any objective lens. When a dove prism is utilized in the optical system lenses are symetrically disposed with respect thereto, or collimated. However, with the novel mirror system of the invention utilized in the camera, lens means may be provided on only one side of the mirror, with the lens being interposed between the objective lens and the mirror. The prism or mirror system works in conjunction with the lens relay system to keep the picture or image from tumbling as it is transmitted onto the film strip.

The film strip is disposed at the focal point of the lens during exposure thereof, and moves continuously during a filming operation. The focal point may be at substantially any distance from the lens as the mechanical elements of the camera permit. A secondary aperture is provided as close to the film portion being exposed as possible, with the secondary aperture being of substantially the same size as the aperture in the usual C-mount (for 16mm film only). A pair of sprockets are provided with one of said sprockets pulling the film from the supply reel and the second of said sprockets pulling the film across the shutter aperture for exposure. This substantially precludes stretching of the film during the high speed operation of the camera. The film may be moved through the camera at high frame rates, limited only by the frame size and the tensile strength of the film.

It is an important object of this invention to provide a motion picture camera wherein a maximum amount of light is admitted into the camera for permitting efficient exposure of the film at high film speed in sunlight.

Another object of this invention is to provide a novel high speed motion picture camera wherein the optical system is particularly designed and constructed for maintaining the loss of light passing through the camera at a minimum, thus facilitating efficient photographing at high film speeds.

Still another object of this invention is to provide a novel high speed motion picture camera wherein color separation is substantially eliminated or greatly reduced for increasing the efficiency of high speed photographic operation.

BRIEF DESCRIPTION OF THE DRAWINGS

Other and further objects and advantageous features of the present invention will hereinafter more fully appear in connection with a detailed description of the drawings in which:

FIG. 4 is a plan view of a disc type shutter which may be utilized in the invention.

FIG. 5 is a view taken on line 5—5 of FIG. 4.

FIG. 6 is a side elevational view, partly in section, of a squirrel cage type shutter which may be utilized in the invention.

FIG. 6a is an enlarged elevational view of a drive wheel arrangement for the shutter system depicted in FIG. 6.

FIG. 7 is a side elevational view of a shutter belt type shutter which may be utilized in the invention.

FIG. 8 is a view taken on line 8—8 of FIG. 7, particularly illustrating a shutter belt member.

FIG. 11 is a schematic view of a dove prism type optical system such as may be utilized in the invention.

FIG. 12 is a schematic view of a front surface mirror optical system such as may be utilized in the invention.

FIG. 12A is a broken view of a film strip depicting schematically the direction of the image transmitted thereto by the optical system.

FIG. 13 is a view similar to FIG. 12 showing a modified mirror type optical system which may be utilized in the invention.

FIG. 14 is a view similar to FIG. 12 depicting still another optical system.

Figure 1:
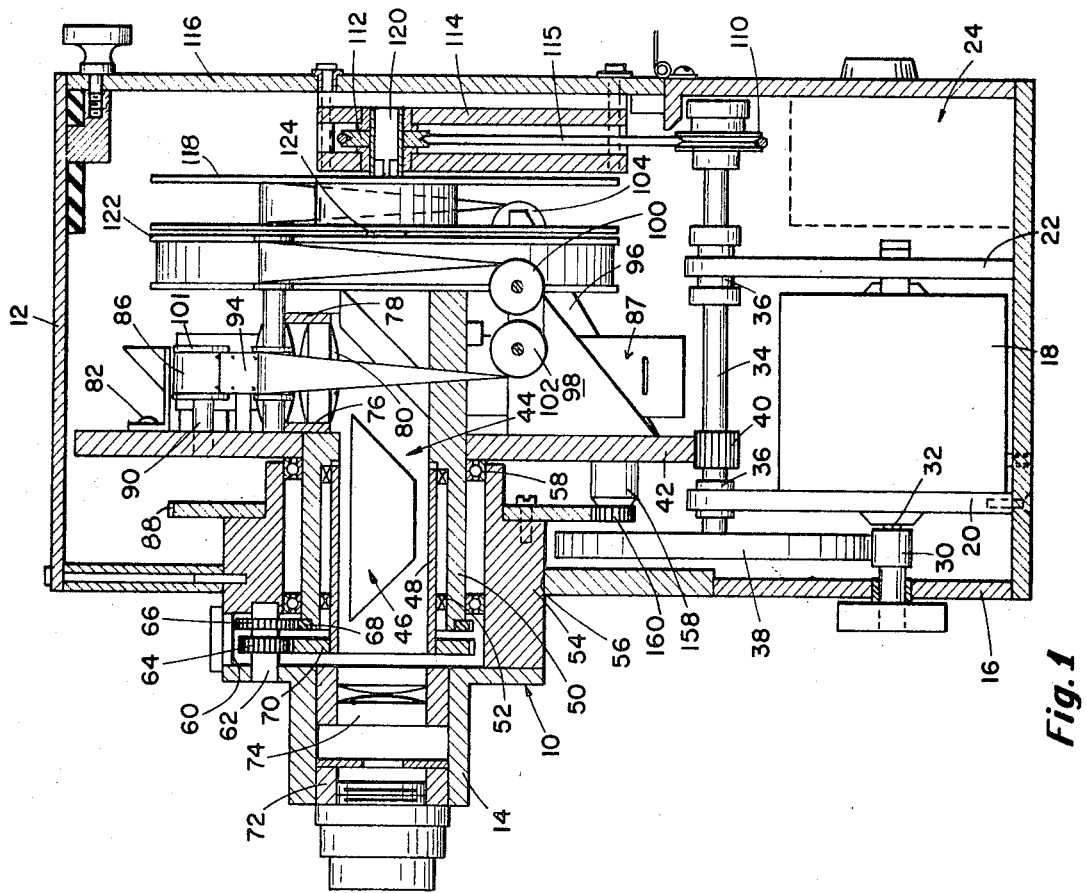
FIG. 1 is a sectional elevational view of a motion picture camera embodying the invention.
Figure 2A:
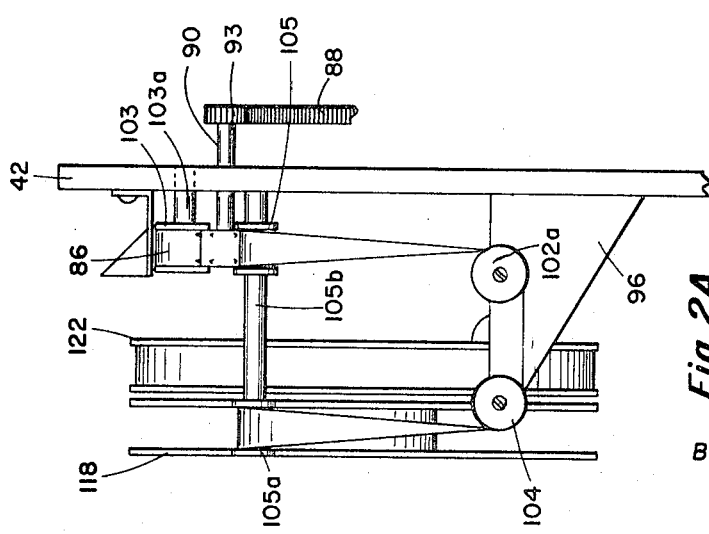
FIG. 2A is a view taken on line 2A — 2A of FIG. 2.
Figure 2:
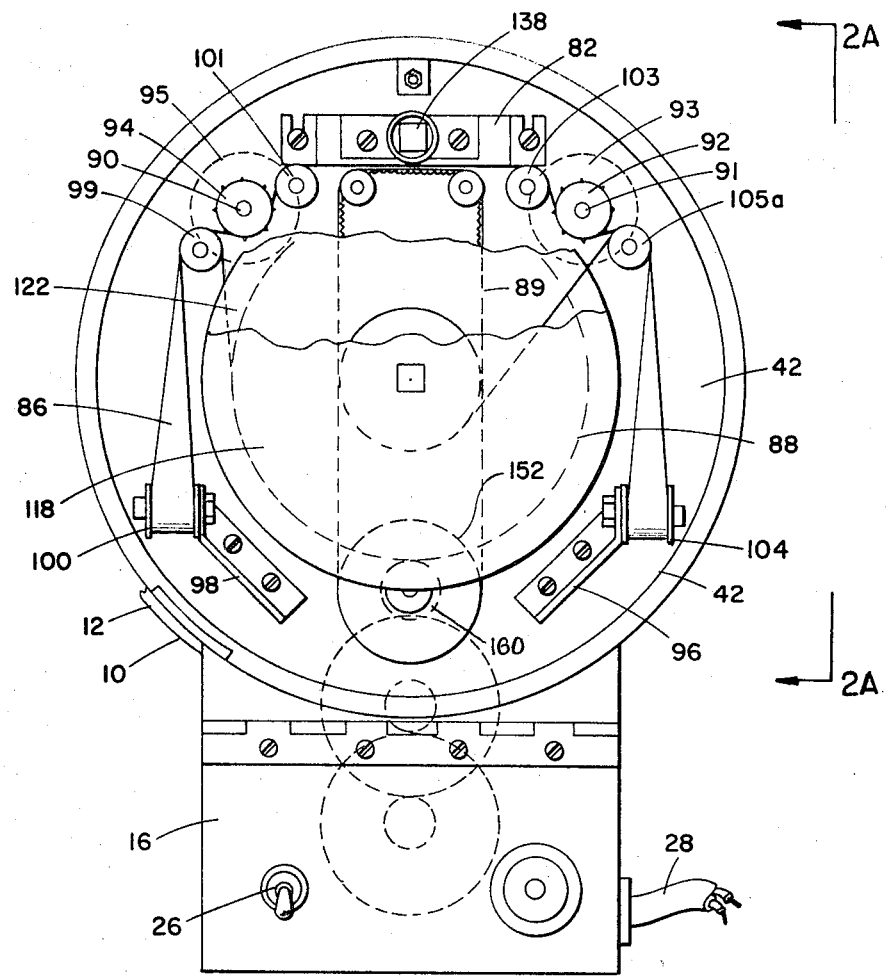
FIG. 2 is a rear elevational view of the camera shown in FIG. 1 with portions thereof eliminated and portions broken away for purposes of illustration.

Referring to the drawings in detail, and particularly to FIGS. 1 and 2, reference character 10 generally indicates an epicyclic motion picture camera comprising an outer housing 12 having a barrel 14 provided thereon. The housing 12 is preferably of a substantially circular configuration, but not limited thereto, and is provided with an outwardly and downwardly extending casing portion 16 for housing the usual motor 18 therein. The motor 18 may be mounted in the casing 16 in any suitable manner, and as shown herein is suitably secured between a pair of upstanding support members 20 and 22 which in turn may be bolted, or otherwise secured to the casing 16. In addition, the usual electronic controls (not shown) normally utilized in high speed cameras, and suitable thermal controls (not shown) for control of the speed and heating conditions of the camera may be suitably mounted in the casing portion 16 as generally indicated at 24. Of course, a suitable on-off switch 26 may be mounted on the outer surface of the casing 16 and operably connected with the motor 18, electronic controls and thermal controls for selective control thereof, as is well known, and suitable electrical conduit 28 is operably connected with the electrical components of the camera for connection with a suitable power source (not shown) as is well known.

A gear member 30 (FIG. 1) is suitably keyed or splined to the drive shaft 32 of the motor 18 for rotation thereby. A shaft 34 is spaced from the motor 18 and disposed substantially parallel with the drive shaft 32. The shaft 34 is journalled in suitable bearings 36 provided in the support members 20 and 22 and extends therethrough as clearly shown in FIG. 1. A gear 38 is secured to the left end of the shaft 34, as viewed in FIG. 1, and is in meshing engagement with the gear 30 for rotation thereby. A gear 40 is secured to the shaft 34 in spaced relationship to the gear 38 and is rotated simultaneously with the shaft 34 which rotates with the gear 38. The gear 40 is preferably relatively small and is in meshing engagement with a relatively large gear 42 for transmitting rotation thereto. The gear 42 is a support plate or disc for an optical system generally indicated at 44.

The optical system 44 comprises suitable reflecting means generally indicated at 46, the details of which will be hereinafter set forth, disposed within an inner cylindrical housing 48 which is rotatably and concentrically disposed within an outer cylindrical housing 50. Suitable bearings 52 are interposed between the housings 48 and 50 for facilitating relative rotation therebetween, as is well known. The outer housing 50 extends through the gear 42 and is centrally disposed therein whereby the longitudinal axes of the housings 48 and 50 are in alignment or conterminous with the axis of the gear 42. The housing 50 may be keyed, pressed into, or otherwise secured in the gear 42 for rotation simultaneously therewith for a purpose as will be hereinafter set forth. A mounting sleeve 54 is disposed within an aperture 56 provided in the housing 12 and is concentrically disposed around the sleeve 50 as clearly shown in FIG. 1. Suitable bearings 58 are interposed between the sleeve 54 and the housing 50 for rotatably supporting the housing within the camera 10. In addition, the barrel 14 is secured to the outer end of the sleeve 54 in any well known manner (not shown) whereby the axis of the barrel 14 is in substantial alignment with axes of the housings 48 and 50.

A recess 60 is provided in the sleeve 54 adjacent the barrel 14, and a shaft 62 is journalled in the recess between the sleeve 54 and the barrel 14. A pair of spaced gears 64 and 66 are keyed or otherwise secured to the shaft 62 for simultaneous rotation therebetween. The gear 66 is preferably somewhat larger in diameter than the gear 64 and is in meshing engagement with a gear 68 provided around the outer periphery of the outer housing 50. The inner housing 48 extends beyond the outer or left hand end of the outer housing 50, as shown in FIG. 1, and a gear 70 is provided around the outer periphery thereof in meshing engagement with the gear 64. As the gear 42 is rotated by the gear 40, the outer housing 50 rotates simultaneously with the gear 42. This rotation is transmitted to the gear 66 through the gear 68. The gear 66 rotates the shaft 62 and gear 64 for transmitting rotation to the inner housing 48 through the gear 70. The gear ratio between the gears 64, 66, 68 and 70 is preferably selected whereby the inner housing 48 and reflecting means 46 rotates at one-half the speed of the rotation of the gear 42 for a purpose as will be hereinafter set forth.

A suitable objective lens 72 and the usual C-mount (for 16 mm film only for purposes of illustration) therefor is provided in the barrel 14 as is well known. The lens 72 may be of any desired type or size, such as a 25 millimeter lens, but not limited thereto. The lens 72 may be manually moved or slid within the barrel, and may be locked in place by a suitable set screw, or the like (not shown) in order to facilitate or achieve the desired focusing for the operation of the camera 10. A suitable lens means 74 is disposed within the barrel 14 behind or to the right of the lens 72 as shown in FIG. 1. The lens 74 is preferably an achromatic lens and is of a size to accept all of the light admitted into the camera through the lens 72. For example, the lens 74 may preferably be an F1 lens. In addition, the lens 74 is preferably a collimator and is preferably spaced from the lens 72 a sufficient distance for interrupting the image prior to the focus point of the lens 72 and receiving the image therefrom. The lens 74 may be adjustably disposed within the barrel for slidable movement therein, and may be securely retained in the selected position therefor in any well known manner, such as by a set screw, or the like (not shown). The reflecting means 46 receives the image from the lens 74 and transmits the image in a manner as will be hereinafter set forth.

The housing 50 extends beyond the gear 42 and is provided with an aperture 76 in communication with the sleeve 78 which extends at right angles from the housing 50. The particular reflecting means 46 depicted in FIG. 1 is of a dove prism type, and in this particular instance, a second lens 80 is necessary and is suitably secured within the sleeve 78. The lenses 74 and 80 are preferably symmetrically disposed with respect to the reflecting system 46. Bracket means generally indicated at 82 is bolted or otherwise secured to the rear surface of the gear 42 and spaced in approximate alignment with the sleeve 78 supporting an eyepiece 84 and providing a guide for a film strip 86, as will be hereinafter set forth in detail. In addition, shutter means generally indicated at 87 is secured to the rear face of the gear 42 for movement simultaneously therewith as will be hereinafter set forth.

A stationary gear member 88 is bolted or otherwise secured to the sleeve 54. A pair of circumferentially spaced shafts or rods 90 and 91 (only one of which is shown in FIG. 1) are carried by the gear 42 and extend rearwardly therefrom for supporting rotatable sprocket members 92 and 94 (FIG. 2) thereon. In addition, a pair of circumferentially spaced brackets 96 and 98 are secured to the rear face of the gear 42 and extend outwardly therefrom. A pair of spaced flanged rollers 100 and 102 are journalled on the bracket 98 for a purpose as will be hereinafter set forth. A flanged roller 102a (FIG. 2A) in axial alignment with the roller 102 is journalled on the bracket 96, and a second flanged roller 104 is also journalled on the bracket 96, all for a purpose as will be hereinafter set forth.

A friction type pulley member 110 is suitably secured to the shaft 34 spaced rearwardly from the gear 40 and rotates simultaneously with the shaft 34. A similar pulley 112 is journalled in a housing 114 in such a manner that the pulleys 110 and 112 are in substantially planar alignment, and a belt member 115 extends around and between the pulleys whereby rotation is transmitted from the pulley 110 to the pulley 112, as is well known. The housing 114 may be bolted or otherwise secured to the cover 12 in any suitable manner. Of course it is preferable to provide a hinged door member 116 on the rear portion of the housing 12 for permitting access to the interior of the camera 10. The housing 114 may be secured to the door 116 in any suitable manner and as a matter of convenience. A suitable film take-up reel 118 is secured to a central shaft 120 of the pulley 112 and is rotatable simultaneously with the pulley 112. A free wheeling film supply reel 122 is mounted on a shaft 124 which is axially disposed with respect to the reel 118. The reels 118 and 122 as shown in FIGS. 1 and 2 are mounted in axial alignment with the lenses 72 and 74. The reel 122 is frictionally restrained in any well known manner to prevent over running of the reel when stopping the operation of the camera.

Figure 3:
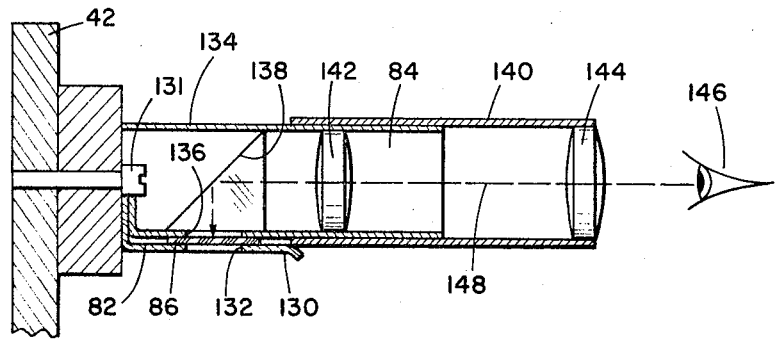
FIG. 3 is an enlarged sectional view of an eyepiece as may be utilized in the invention.

Referring now to FIG. 3, the eyepiece 84 and bracket means 82 are depicted in greater detail. The bracket means 82 as shown herein comprises a substantially horizontally disposed support member 130 secured to the gear 42 in any suitable manner, such as by a screw or bolt member 131. An aperture 132 is provided in the horizontally disposed support 130. The aperture 132 is preferably of substantially the same size as the aperture in the C-mount of the objective lens 72. The film strip 86 passes substantially immediately over the upper surface of the support 130. The support member 130 is so spaced with respect to the optical system 46 as to be as close to the film 86 as possible when the film 86 is disposed at the focal point of the lenses of the optical system.

A sleeve member 134 is suitably secured to the gear 42 in close proximity of the support 130 whereby the film strip 86 passes between the support member 130 during operation of the camera 10. An aperture 136 is provided in the side wall of the sleeve 134 in approximate alignment with the aperture 132. An angularly disposed reflective surface 138 of any well known or suitable type is mounted within the sleeve. An extension sleeve 140 is suitably secured to the sleeve 134 and a pair of suitable lenses 142 and 144 are provided in the eyepiece 84 whereby the eye 146 of the photographer or viewer may peer through the eyepiece 84, with a line of vision as indicated by the dotted line 148. In this manner, the photographer may visually ascertain what he is going to photograph, and may properly adjust the optical system 46 and the lenses as is well known.

The shutter element 87 as shown in FIGS. 1 and 2 is of the shutter belt type, shown in more detail in FIGS. 7 and 8. The shutter 87 comprises an endless geared belt 150 disposed around a drive gear 152 and a plurality of spaced rollers 154. Whereas the belt 150 may be of any suitable type, the belt shown herein is a high precision "Posi-Drive" belt manufactured by Pacific Belting Industries, Inc. and as set forth in detail in the Belts and Pulley Product Bulletin PB 1000–1. The gears 152 and 154 are also preferably of the type shown in the aforementioned Pacific Belting Industries, Inc. bulletin, but not limited thereto. The belt 150 is provided with longitudinally spaced teeth 156 on the inwardly disposed surface thereof, and the teeth 156 are of a pitch and height complementary with the pitch and height of the teeth of the gear pulleys 152 and 154, as set forth in the aforementioned bulletin, whereby the belt is driven smoothly and evenly by the rotation of the gears as will be hereinafter set forth.

The gears 154 are suitably journalled on the gear 42 and move as a unit therewith, but are freely rotatable with respect thereto. The drive gear pulley 152 is keyed or otherwise secured to a drive shaft 158 which is suitably journalled in the gear 42 and extends through the gear 42 in a direction toward the stationary gear 88 as shown in FIG. 1. A planet gear 160 is secured to the outer end of the shaft 142 and is in meshing engagement with the stationary gear 88. As the gear 42 is rotated, the gear 160 rolls around the stationary gear 88 and transmits rotation to the drive gear pulley 152, thus moving the belt 156 continuously around the pulleys 152 and 154 during rotation of the gear 42. In addition, the belt 150 is provided with transversely extending longitudinally spaced apertures or slits 162. The width of the shutter slits or openings 162 may vary, and the particular width of the slot 162 is selected in accordance with a desired ratio of shutter speed to film speed. By way of example, assuming that 16 mm film is being used and the direction of movement of the film strip is opposite the direction of movement of the belt 150, if the shutter slot 162 is 0.0375 inch wide, the ratio of shutter speed to film speed should be 8 to 1; if the width of the slot is 0.075 inch the shutter speed to film speed ratio should be 16 to 1; if the slot is 0.150 inch wide, the ratio of shutter speed to film speed should be 32 to 1. The exposure time is equal in all of these ratios. In order to increase the exposure time, it is necessary to reduce the ratio of film speed to image speed. The belt 150 may either move in the same direction as the film strip 86, or may move in an opposite direction with respect thereto, as will be hereinafter set forth. In the event the direction of rotation of the film take up reel is the same as the direction of movement of the belt 150, the slits 162 will, of course, be of a smaller width because the time of the exposure of the film will be increased with respect to the time of the film exposure when the belt 150 moves in an opposite direction from the film strip. It is to be understood that there is no intention of limiting the invention to any particular film size or film speed, nor to any type objective lens or type of film, and the examples set forth herein are merely illustrative.

Substantially any suitable shutter system may be utilized in lieu of the belt type shown in FIGS. 7 and 8. For example, a slotted disc type shutter device generally indicated at 164 is shown in FIGS. 4 and 5. The device 164 comprises a disc 166 carried by a bevel gear 168, or the like, for rotation thereby. The gear 168 may be mounted on a vertically disposed shaft 170 which in turn is suitably journalled on a support flange 172. A second bevel gear 174 is in meshing engagement with the gear 168 for transmitting rotation thereto as is well known. The gear 174 is carried by a shaft 176 which is suitably journalled in the gear 42 (not shown in FIGS. 4 and 5). The shaft 176 extends through the gear 42 and a spur gear 178, or the like, is carried on the outer end of the shaft 176 for engagement with the stationary gear 88. As the gear 42 rotates, the gear 178 rolls around the outer periphery of the stationary gear 88 and transmits rotation to the bevel gear 174, which in turn transmits rotation to the gear 168 for rotation of the gear 168 about a vertical axis. Of course, the bracket 82 is suitably secured to the rear surface of the gear 42 by a suitable bracket (not shown), and the flange 172 may also be secured to the said support bracket. The disc 168 is provided with a radially extending slit or opening 180 on the outer periphery thereof which passes in alignment with the aperture 132 of the bracket member 130 as the disc 168 is rotated, thus permitting intermittent exposure of the film 86, as will be hereinafter set forth.

Referring to FIGS. 6 and 6a, a squirrel cage type shutter generally indicated at 182 is depicted which comprises a shaft 184 journalled in the gear 42 (depicted broken in FIG. 6) and extending therethrough for supporting a spur gear 186, or the like, which is in meshing engagement with a similar gear 187 (FIG. 6a). The gear 187 is carried by a relatively short shaft (not shown) journalled in the gear 42. The gear 187 is similar to the gears 160 and 178 and is in meshing engagement with the stationary gear 88. The gear 187 rolls around the gear 88 as the gear 42 rotates, thus transmitting rotation to the gear 186. A gear 188 is provided on the opposite end of the shaft 183 and engages a gear 190 which is journalled for rotation by a pivot pin 192, or the like, which in turn is secured to the optical system 46 in a manner as will be hereinafter set forth, and a portion of which is schematically depicted at 46a and 46b in FIG. 6. A cage member 194 is also rotatably secured to the pin 192 and is open at one end 196 for receiving the optical system members 46a and 46b therein. A suitable thrust bearing 198 is provided in the cage 194 and is interposed between the cage 194 and the optical system 46 for facilitating rotation of the cage 194 with respect thereto. The gear 186 rolls around the gear 88 as the gear 42 carries the shaft 184 during rotation of the gear 42. The gear 186 thus transmits rotation to the gear 188 through the shaft 184 for rotating the gear 190 and simultaneously rotating the cage 194. A plurality of circumferentially spaced elongated slots 200 are provided in the cylindrical sidewalls of the cage 194 and are in substantial alignment with the apertures 132 of the bracket member 130 (not shown in FIG. 6) for permitting intermittent exposure of the film 86 during rotation of the cage 194.

Referring now to FIG. 11, the reflecting means 46 as shown in FIG. 1 is shown schematically in greater detail. The mirror or reflecting means 46 comprises a dove prism 202 disposed in substantial axial alignment with the lens 74 and secured within the inner housing 48 in any suitable manner (not shown) for rotation simultaneously therewith about the longitudinal axis of the prism 202. A mirror or reflecting surface 204 is spaced from the prism 202 and interposed between the prism 202 and the lens 80. The reflecting surface 204 is disposed at an angle of 45° with respect to the axis of the lens 74, prism 202 and lens 80 as is well known. As hereinbefore set forth, the lens 74 is preferably a collimator type lens, but not limited thereto, and the bundle of light indicated by the dotted lines 206 in FIG. 11 is transfered from the objective lens 72 to the prism 202 and moves through the prism 202 as indicated by the dotted lines. As is well known, the image (not shown) carried by the bundle of light 206 is inverted as it passes through the prism 202 and is passed to the reflecting surface 204, which is preferably in the form of a front surface mirror, but not limited thereto. The light is reflected from the surface 204 and into the lens 80, and as is well known, the inverted image carried by the light is erected or reverted whereby the image transmitted to the lens 80 as shown by the dotted lines 208 is positioned substantially identically with the position thereof as transmitted by the lens 74. Of course, as hereinbefore set forth, the prism 202 is rotated about its longitudinal axis, or orientated in such a manner that the image directed to the film is normally in an upright position longitudinally on the film strip, as shown in FIG. 12A for normal projection of the film. However, the orientation of the prism 202 may be such as to pass the image to the film in any desired position thereon, such as for trick photography or other useful photography purposes.

As hereinbefore set forth, the dove prism is secured within the inner housing 48 for rotation simultaneously therewith. The reflecting surface 204 is suitably secured within the outer housing 50 as more particularly indicated in FIG. 1 for rotation simultaneously therewith. Thus the reflecting surface 204 rotates at twice the speed of the dove prism 202. Rotation of the prism 202 about its longitudinal axis causes the image passing therethrough or being reflected thereby to turn through 360° for each 180° of rotation of the prism, thus by rotating the prism at one half the speed of rotation of the reflecting surface 204, the image is maintained at a constant position during exposure thereof onto the film 86. Furthermore, the bundle of light indicated by the dotted lines 208 reaching the relay lens 80 is of substantially the same size as the bundle of light 206 leaving the lens 74. Of course, the lens 80 properly focuses the light received thereby for proper "in focus" exposure of the film 86. As hereinbefore set forth, the film 86 is disposed at the proper focal length from the lens 80 for providing an efficient filming operation for the camera 10.

Referring to FIG. 12, a modified reflecting system generally indicated at 210 is shown which provides a generally similar type reflecting system as that shown in FIGS. 1 and 11. In this embodiment, a first angularly disposed reflecting surface 212 is secured within the outer housing 48 and angularly disposed with respect to the axis of the lens 74. The reflecting surface 212 is preferably in the form of a front surface mirror, but not limited thereto, and is disposed in substantially axial alignment with the lens 74 for receiving the light beam or image therefrom as indicated by the dotted lines 214. A second reflecting surface 216 is suitably secured within the housing 48 in spaced relation to the first reflecting surface 212 and is substantially parallel to the axis of the lens 74. The reflecting surface 216 is also preferably a front surface mirror, but not limited thereto, and receives a light beam from the surface 212 as schematically indicated by the dotted lines 218. A third reflecting surface 220 is secured in the housing 48 conterminous with the first surface 212 and at an oppositely disposed angle with respect thereto. The surface 220 is also preferably a front surface mirror, but not limited thereto and receives the light beam or image from the surface 216 as indicated by the dotted lines 222. The beam leaving the surface 220 is indicated by the dotted lines 224 and are directed to a fourth reflecting surface 226. The surface 226 is preferably a front surface mirror, but not limited thereto, and the image revived thereby is inverted with respect to the image transmitted by the lens 74 in a manner similar to that handled by the prism 202. The surface 226 is suitably secured in the housing 50 and reverts the image to the position thereof as transmitted by the lens 74 and directs the light beam or image to the film 86 as shown by the dotted lines 228. In this instance, it has been found that the need for the lens 80 is eliminated, and the image may be directed to the film 86 by reflecting surface 226, with the film 86 being disposed at the proper focal distance for receiving an efficient image. The surfaces 212, 216 and 220 are revolved at a speed half that of the rotation of the surface 226 for the same purpose as set forth in the system 46, and the surfaces 212, 216 and 220 may be orientated as desired to place the image on the film as shown in FIG. 12A, or any other desired positioning thereof as hereinbefore set forth.

Referring now to FIG. 13, a reflecting system generally indicated at 230 is shown which is similar to the system depicted in FIG. 12. An objective lens 231 having a relatively long back focal length is utilized in the system 230 for admitting the light into the camera. The objective lens 231 is provided with an iris 233 and a suitable annular knurled adjusting ring 235 for adjusting the iris 233 to select the desired F stop for the lens 231 as is well known. A first reflecting surface 232 is suitably secured within the housing 48 in a manner generally similar to the surface 212 and preferably angularly disposed and in substantial alignment with the axis of the objective lens 231 for receiving the image therefrom in much the manner as set forth in connection with the system 10. A second reflecting surface 234, generally similar to the surface 216, is suitably secured within the housing 48 in spaced relationship from the surface 232, and disposed substantially parallel with the axis of the lens 231. A third reflecting surface 236 is conterminous with the surface 232 and is angularly disposed with respect thereto in a manner similar to the surface 220. A fourth reflecting surface 238 is suitably secured in the housing 50 and is angularly disposed in a manner similar to the surfaces 204 and 226. The surfaces 232, 234, 236 and 238 are preferably in the form of front surface mirrors, but not limited thereto. The light beam or image is transferred from the objective lens 231 to the surface 238 in the manner as set forth in connection with the reflecting system 210, and as generally indicated by the dotted line 240. However, the focal length of the lens 231 is of a relatively long length whereby the film 86 is disposed substantially at the focal point of the lens. The image is then transferred to the film 86 by the surface 238, as hereinbefore set forth. In this instance, it has been found that the lens 74 and the lens 80 may be eliminated.

Referring now to FIG. 14, still another reflecting system is generally indicated at 242 which comprises a dove prism 244 similar to the prism 202 and suitably secured in the housing 48 in substantial axial alignment with the lens 74 for receiving the light beam or image therefrom as hereinbefore set forth in connection with the system 46. A suitable relay lens 246, or the like, is disposed in alignment with the prism 242 and oppositely disposed therefrom with respect to the lens 74 and receives the image from the prism 244 for transferring the image or light beam to an angularly disposed reflecting surface 248. The surface 248 is suitably secured within the housing 50 for rotation simultaneously therewith, as hereinbefore set forth, and reflects the image or light beam to the film 86. The bundle of light, or light beam moves through the reflecting system 242 in a manner similar to that of the system 46. However, the light bundle is received by the lens 246 prior to passage thereof to the reflecting surface 248. The light impinging on the lens 246 is substantially the same size as the light leaving the lens 74, but the image is inverted. The light beam is focused by the lens 246 and transferred to the film 86 by the surface 248 which erects or reverts the image in order that the image transferred to the film will be in the same position as when it left the lens 74. The film 86, of course, is properly disposed with respect to the rocal length of the lens 246 for receiving an efficient image therefrom.

In operation, the film supply reel 122, having an adequate length of the film 86 spooled thereon, may be disposed in the camera 10, as is well known. The film 86 is threaded or directed from the supply reel 122 over the outer periphery of a flanged roller 99. The film strip 86 is twisted 90° as shown in FIG. 1 and passes over the outer periphery of the flanged roller 100 whereby the direction of travel of the film strip 86 is changed for passage around the outer periphery of the flanged roller 102. The film strip 86 is twisted another 90° as it leaves the roller 102 and passes over a flanged roller 99a. The roller 99a is disposed in substantial axial alignment with the roller 99 and both rollers 99 and 99a are rotatably mounted on a shaft 99b which is secured to the gear 42 in any suitable manner. From the roller 99a the film strip 86 moves under the first sprocket 94 and over another roller 101 (FIGS. 1 and 2). The roller 101 is suitable journalled on a shaft 101a which is secured to the gear 42, and the rollers 99a and 101 are in alignment with the sprocket 94.

The film strip 86 then passes across the bracket member 130 and moves over a roller 103 which is suitably journalled on a shaft 103a secured to the gear 42, and is preferably disposed in substantial alignment with the roller 101. The film strip 86 then passes beneath the sprocket 92 and over another roller 105 which is rotatably mounted on a shaft 105b suitably secured to the gear 42. The rollers 103 and 105 are in substantial alignment with the sprocket 92. The film 86 is then twisted through approximately 90° and passes over the outer periphery of the roller 102 which changes the direction of travel of the film strip 86 and passes the film strip to the roller 104. The rollers 102 and 104 are both mounted on the bracket 96 in spaced relationship, as hereinbefore set forth, with the roller 104 being in substantial alignment with the roller 105, but perpendicularly disposed with respect thereto, and the roller 104 being disposed in substantial alignment with the take up reel 118, as particularly shown in FIG. 2A. The film 86 moves from the roller 104 through a 90° twist and over a flanged roller 105a which is journalled on the shaft 105b in spaced relationship with the roller 105. From the roller 105a, the film moves onto the take up reel 118. The film is pulled across the bracket member 130 and the aperture 132 by the engagement of the sprockets 92 and 94 with the outer edges of the film 86, and rotation of the take up reel 118 winds the film onto the reel 118 as is well known. In addition, the sprockets 92 and 94 prevent stretching of the film in a fast moving film speed operation.

As hereinbefore set forth, the sprockets 92 and 94 are preferably mounted on the suitable shafts 90 and 91, respectively, which are journalled in the gear 42 and extend therethrough. Gear members 93 and 95 are carried on the outer ends of the shafts 90 and 91, respectively, and are in meshing engagement with the stationary gear 88. The gears 93 and 95 roll around the gear 88 as the gear 42 rotates with respect thereto.

A suitable access window (not shown) is provided in the sleeve 54 to permit access to the gear train 64–66–68–70 for manual actuation thereof for adjusting the orientation of the prism 202 prior to the initiating of a filming operation in order to assure that the image position will be properly orientated in accordance with the desired end picture result, as hereinbefore set forth.

When the motor 18 is activated in the usual manner the gear 42 is rotated through the gear train 30–38–40 as hereinbefore set forth. The take up reel 118 takes up the slack in the film, only, and is rotated through the pulley and belt mechanism 110–112–114. The housing 50 rotates simultaneously with the gear 42, rotating the reflecting member 204 simultaneously therewith. The housing 48 is rotated at a speed one-half that of the rotation of the housing 50 by means of the gear train 64–66–68–70 for rotating the dove prism 202 at half the speed of the reflecting surface 204. This maintains the image constant at the aperture 132 and on the film 86 during exposure thereof.

The shutter belt 150 is driven simultaneously with the rotation of the gear 42 through the engagement of the gear 160 with the stationary gear 88, thus moving the apertures 162 successively across the aperture 132 of the bracket member 130. It is to be noted that the number of teeth in the stationary gear 88 must be in multiples equal to the number of frames in one revolution. This is also true of the sprockets 92 and 94 and the shutter gear. For example, if 16mm film is being used, 32 pitch and 3 teeth equal 1 frame. Each time an opening or aperture 162 moves across the opening or aperture 132 the film strip 86 disposed in alignment with the apertures 132 is exposed to the image being carried by the optical system 46. Of course, the speed of rotation of the gear 42 may be substantially any desired speed in accordance with the gear tooth ratio between the gear 42 and the gear 40. The greater the number of teeth of the gear 42, the slower the mechanical rotational speed thereof. It will be readily apparent that the epicyclic operation of the camera 10 in combination with the dove prism or reflecting mirrors permits an extremely high speed filming operation without the necessity of extremely high rotational speeds of the operating members or elements of the camera.

Figure 9:
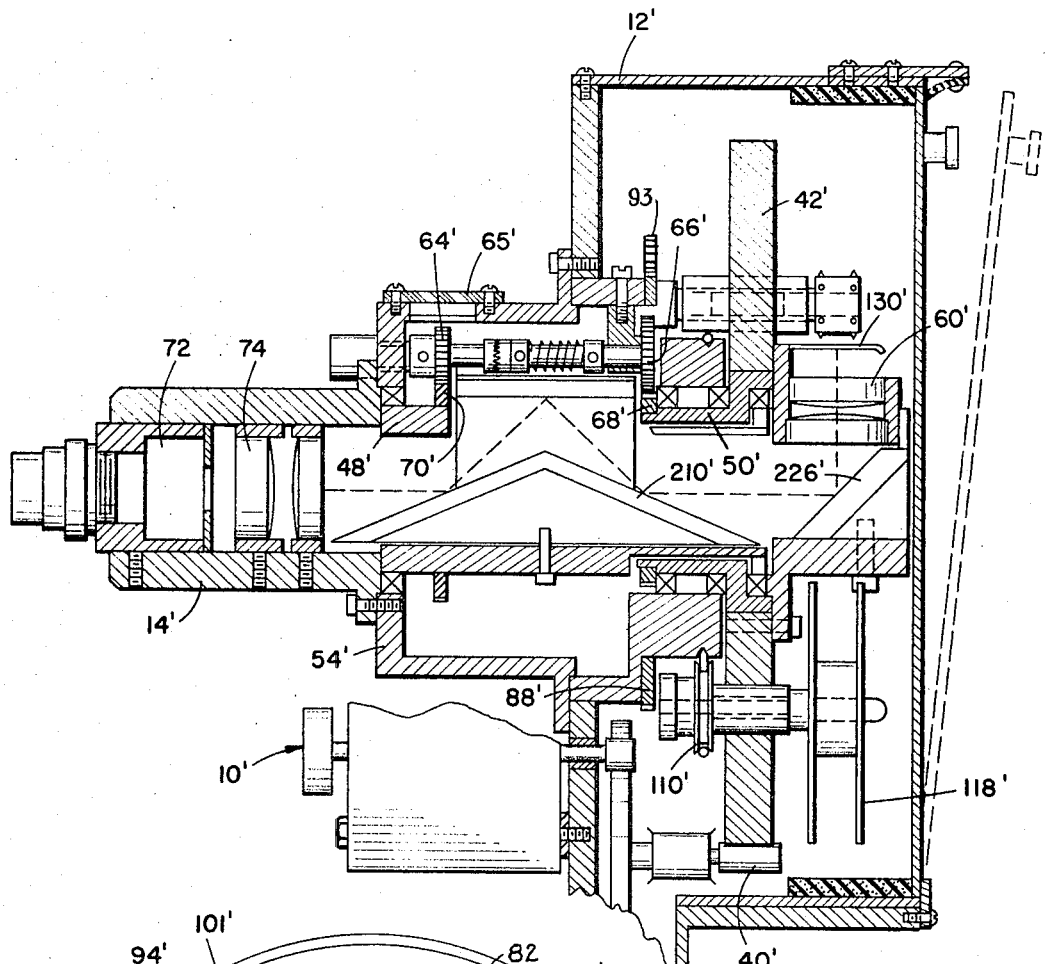
FIG. 9 is a sectional elevational view of a modified camera embodying the invention.
Figure 10:
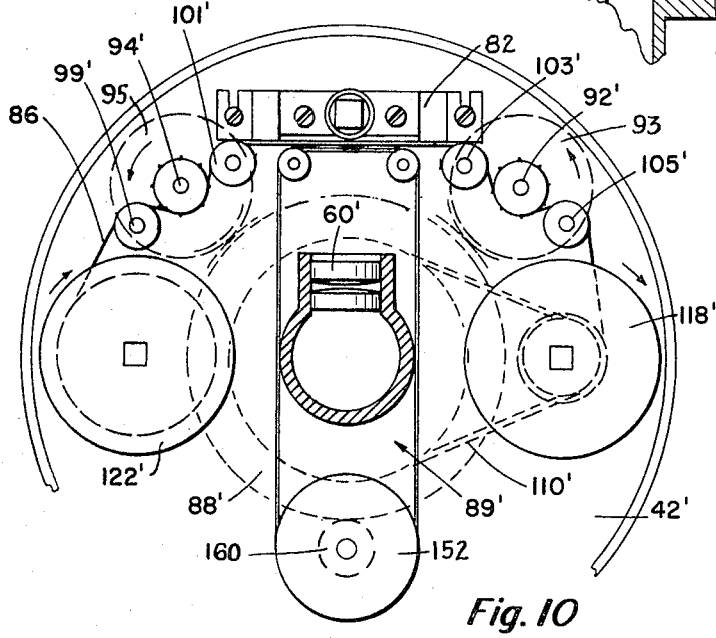
FIG. 10 is a broken front elevational view of the camera depicted in FIG. 9, with portions thereof eliminated for purposes of illustration.

Referring now to FIGS. 9 and 10, a generally similar camera 10' is shown having the objective lens 72 and lens 74 mounted in the barrel 14' in the manner as hereinbefore set forth. A rotatable gear 42' is provided in the camera generally similar to the gear 42 and is driven in a similar manner by a suitable gear 40'. The camera 10' as depicted in FIG. 9 is provided with a reflecting system 210' generally similar to 210, with the exception that a relay lens 60' is provided between the surface 226' and the bracket member 130'. In addition, a suitable shutter mechanism is provided for the camera 10' as hereinbefore set forth, with the particular shutter depicted in FIG. 10 being of the shutter belt type 89. This shutter mechanism 89 may be carried by the rotatable gear 42' in a similar manner as hereinbefore set forth, and may be driven by a stationary gear 88' similar to the gear 88, a hereinbefore set forth.

In addition, a housing 50' generally similar to the housing 50 is carried by the gear 42' and is centrally disposed with respect thereto. The housing 50' rotates simultaneously with the gear 42' and is connected with an inner housing 48' similar to the housing 48 through suitable gear members 64', 66', 68' and 70' for transmitting rotation to the inner housing 48' at half the speed of rotation of the housing 50', as set forth in connection with the camera 10. A stationary sleeve 54' is secured to the cover 12' in any suitable manner and encases the housing 50' and is provided with an access window 65' permitting access to the interior thereof for manual adjustment of the housing 50' for adjusting the orientation of the reflecting system 210' as hereinbefore set forth. The stationary gear 88' is carried by the sleeve 54' and functions in much the same manner as the stationary gear 88 of the camera 10.

The most significant distinction between the camera 10' and the camera 10 is the fact that the film supply reel 122' and the film take up reel 118' are substantially diametrically opposed on the gear 42' rather than being in axial alignment with the gear and reflecting means as shown in the camera 10. The take up reel 118' is driven by a suitable pulley and belt mechanism 110' similar to that shown in FIG. 1. The film strip 86 is pulled from the supply reel 122' and moves across sprockets 92' and 94' and complementary rollers 99', 101', 103', and 105' in the manner as hereinbefore set forth for substantially precluding stretching of the film during a high film speed operation. The sprocket 94' pulls the film from the supply reel 122' and the sprocket 92' pulls the film across the shutter and the take up reel 118' pulls the film from the sprocket 92'.

The function and operation of the camera 10' is substantially identical with the operation of the camera 10, with the epicyclic action and dove prism combination permitting a simpler and lower speed camera without extremely high mechanical motion speeds. As hereinbefore set forth, both the camera 10 and 10' are provided with the usual electronic controls, motor, and thermal controls as well known in high speed cameras.

The invention in no manner is limited to the exposure of any particular number of frames per revolution. The number of frames per revolution which may be exposed depends on the ratio between the stationary gear and the planet gear driving the shutter mechanism. The film is disposed at the focal point of the lens and this focal point may be at any distance from the lens as the mechanical elements of the camera permit. Furthermore, the movement of the film is started rapidly in a high speed camera operation, which usually results in stretching of the film, but the sprocket arrangement of the present camera substantially eliminates stretching of the film. During the filming operation, the picture image being transmitted to the film for exposure stays stationary with respect thereto which the dove prism type reflecting system does by cancelling the tumbling of the image produced by the 45° mirror.

It is to be understood that the epicyclic camera principle disclosed herein may not only be utilized efficiently for high speed filming operations, as hereinbefore set forth, but also used for improving the efficiency of slow speed filming operations. There is no intention of limiting the invention to the use of high speed filming only.

Furthermore, whereas the eye piece 84 is depicted in FIG. 3 as being secured in position by a screw 131, it is to be noted that the eye piece 84 is removably secured by the screw 131, and is removed from the camera during an acutal filming operation. It will be apparent that any suitable quick-release type connection (not shown) may be provided for securing the eye piece in the camera in lieu of the screw 131.

From the foregoing it will be apparent that the present invention provides a novel high speed motion picture camera utilizing an epicyclic action in combination with a dove prism type reflecting system which permits dynamically balanced high speed operation without excessive high mechanical speeds of the working elements thereof. In addition, the camera is particularly designed and constructed for admitting all the light possible into the camera and maintaining the loss of light passing through the camera at a minimum to permit efficient high speed filming in sunlight not heretofore possible. The principle of the invention may be applied to substantially any film sizes and film speeds, and the exposure of substantially any number of frames per revolution may be obtained by selection of the proper ratio between the stationary gear and planet gear. The novel camera is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. In a motion picture camera, power driven rotary support means, stationary gear means, shutter means carried by the rotary support means, means operably connected between the stationary gear means and the shutter means for actuation of the shutter means upon rotation of the support means, power driven film strip dispensing and take-up means, sprocket means carried by the support means and engagable with the film strip for moving the film strip across the shutter means, means operably connecting the sprocket means with the stationary gear means for rotation of the sprocket means during rotation of the rotary support means, first reflector means carried by the rotary support means and rotatable simultaneously therewith, second reflector means carried by the support means and operably connected with the first reflector means for rotation simultaneously therewith at one half the rotational speed thereof, and lens means cooperating with the first and second reflector means for transmitting a light beam to the film strip moving across the shutter means.

2. In a motion picture camera, a combination as set forth in claim 1 wherein the second reflector means comprises cooperating front surface mirrors receiving the light beam and transmitting the light beam to the first reflector means with a minimum of loss of light.

3. In a motion picture camera, a combination as set forth in claim 2 wherein the first reflector means comprises a front surface mirror receiving the light beam from the second reflector means and transmitting the light beam to the film strip with a minimum of loss of light.

4. In a motion picture camera, a combination as set forth in claim 1 wherein the second reflector means comprises a first angularly disposed reflecting surface initially receiving the light beam, a second reflecting surface spaced from the first reflecting surface and substantially parallel with the axis thereof for receiving the reflected light beam therefrom, a third reflecting surface conterminous with the first reflecting surface and disposed at an opposite angle with respect thereto for receiving the reflected light beam from the second reflecting surface and transmitting the light beam to the said first reflector means.

5. In a motion picture camera, a combination as set forth in claim 4 wherein the first and second and third reflecting surfaces are in the form of front surface mirrors.

6. In a motion picture camera, a combination as set forth in claim 1 wherein the second reflector means comprises a dove prism, and the first reflector means comprises an angularly disposed reflecting surface in substantial alignment with the dove prism.

7. In a motion picture camera, a combination as set forth in claim 1 wherein the lens means comprises objective lens means receiving the light beam for directing the light beam to the second reflector means, said second reflector means transmitting the light beam to the first reflector means with a minimum of loss of light, and said first reflector means transmitting the light beam to the film with a minimum loss of light.

8. In a motion picture camera, a combination as set forth in claim 1 wherein the lens means comprises an objective lens for initially receiving the light beam, an achromatic lens means interposed between the objective lens and the second reflecting means for transmitting the light beam therebetween.

9. In a motion picture camera, a combination as set forth in claim 1 wherein the lens means comprises an objective lens for initially receiving the light beams, first lens element means interposed between the objective lens and the second reflecting means for transmitting the light beam therebetween, and second lens element means interposed between the first reflector means and the film strip for transmitting the light beam therebetween.

10. In a motion picture camera, a combination as set forth in claim 1 wherein the lens means comprises lens elements symetrically disposed about the first and second reflector means.

11. In a motion picture camera, a combination as set forth in claim 1 wherein the lens means comprises lense elements disposed on opposite ends of the second reflector means.

12. In a motion picture camera, a combination as set forth in claim 1 wherein the film strip dispensing and take-up means comprises a power driven rotatable take-up reel mounted in substantially axial alignment with the rotary support means and first and second reflector means, and a rotatable film supply reel mounted in substantial axial alignment with the take-up reel.

13. In a motion picture camera, a combination as set forth in claim 1 wherein the film strip dispensing and take-up means comprises a rotatable take-up reel carried by the rotary support means, and a rotatable film supply reel carried by the rotary support means and spaced from the take-up reel.

14. In a motion picture camera, a combination as set forth in claim 1 wherein the means operably connected between the stationary gear means and the shutter means is a planet gear in meshing engagement with the stationary gear for movement therearound upon rotation of the rotary support means providing an epicyclic action for the camera.

15. In a motion picture camera, a combination as set forth in claim 1 wherein the means operably connecting the sprocket means with the stationary gear means comprises planet gear means in meshing engagement with the stationary gear for movement therearound upon rotation of the rotary support means providing an epicyclic action for the camera.

16. In a motion picture camera, a combination as set forth in claim 1 wherein the lens means includes a lens element for admitting a maximum amount of light into the camera, and said first and second reflector means transmits the light in the form of a light beam to the film strip with a minimum of loss of light.

17. In a motion picture camera, a combination as set forth in claim 1 wherein the sprocket means engages the film strip in a manner for cooperating therewith to reduce stretching of the film strip in a high speed filming operation.

18. In a motion picture camera, a combination as set forth in claim 1 and including means operably connected with the second reflector means for adjusting the orientation thereof to provide a preselected positioning of an image transmitted to the film strip by the light beam.

19. In a motion picutre camera, a combination as set forth in claim 18 wherein the adjusting means comprises manually operated gear means operably connected with the second reflector means for orientation thereof with respect to the lens means and first reflector means to provide said preselected positioning of the image on the film.

20. In a motion picture camera, a combination as set forth in claim 18 wherein the said preselected position of the image on the film strip may produce trick photography results for the photographing operation.

21. In a motion picture camera, a combination as set forth in claim 18 wherein said preselected position of the image on the film strip may orientate the image thereon for facilitating the study of the image.

* * * * *